(12) United States Patent
Siebert

(10) Patent No.: US 7,941,993 B2
(45) Date of Patent: May 17, 2011

(54) ENGINE COOLING

(75) Inventor: Annegret W. Siebert, Derby (GB)

(73) Assignee: Rolls-Royce plc, London (GB)

( * ) Notice: Subject to any disclaimer, the term of this patent is extended or adjusted under 35 U.S.C. 154(b) by 845 days.

(21) Appl. No.: 11/984,472

(22) Filed: Nov. 19, 2007

(65) Prior Publication Data

US 2008/0314019 A1 Dec. 25, 2008

Related U.S. Application Data

(63) Continuation-in-part of application No. 10/962,449, filed on Oct. 13, 2004, now abandoned.

(30) Foreign Application Priority Data

Oct. 14, 2003 (GB) .................................. 0323993.6

(51) Int. Cl.
*F02G 3/00* (2006.01)
(52) U.S. Cl. ..................... 60/39.093; 60/266; 244/134 R
(58) Field of Classification Search ................. 60/266, 60/267, 39.093; 244/134 R, 53 B; 137/15.1
See application file for complete search history.

(56) References Cited

U.S. PATENT DOCUMENTS

| | | | | | |
|---|---|---|---|---|---|
| 3,623,546 | A | * | 11/1971 | Banthin et al. ................... 165/51 |
| 3,967,443 | A | * | 7/1976 | McMurtry .................... 60/226.1 |
| 4,027,728 | A | * | 6/1977 | Kobayashi et al. ....... 165/104.27 |
| 4,122,356 | A | * | 10/1978 | Decker ............................ 290/52 |
| 4,351,150 | A | * | 9/1982 | Schulze ........................ 60/226.1 |
| 4,504,030 | A | * | 3/1985 | Kniat et al. ...................... 244/57 |
| 4,574,584 | A | * | 3/1986 | Hovan .............................. 60/782 |
| 4,608,819 | A | * | 9/1986 | Colman et al. ................ 60/39.83 |
| 4,782,658 | A | * | 11/1988 | Perry ............................ 60/226.1 |
| 4,914,904 | A | * | 4/1990 | Parnes et al. .................. 60/226.1 |
| 5,123,242 | A | * | 6/1992 | Miller ........................... 60/226.1 |
| 5,203,399 | A | * | 4/1993 | Koizumi ................... 165/104.33 |
| 5,349,499 | A | * | 9/1994 | Yamada et al. ................ 361/700 |
| 5,357,742 | A | * | 10/1994 | Miller .............................. 60/785 |
| 5,729,969 | A | * | 3/1998 | Porte ............................. 60/226.1 |
| 6,027,078 | A | * | 2/2000 | Crouch et al. ................. 244/204 |
| 6,457,676 | B1 | * | 10/2002 | Breer et al. ................ 244/134 R |
| 6,564,861 | B1 | * | 5/2003 | Miyazaki et al. ......... 165/104.29 |
| 6,931,834 | B2 | * | 8/2005 | Jones ............................ 60/226.1 |
| 6,990,797 | B2 | * | 1/2006 | Venkataramani et al. ...... 60/204 |
| 7,575,014 | B2 | * | 8/2009 | Stelzer .......................... 137/15.1 |
| 2004/0020213 | A1 | * | 2/2004 | Jones .............................. 60/772 |
| 2004/0040328 | A1 | * | 3/2004 | Patel et al. .................... 62/259.2 |
| 2005/0050877 | A1 | * | 3/2005 | Venkataramani et al. . 60/39.093 |
| 2005/0150204 | A1 | * | 7/2005 | Stretton et al. ............... 60/39.83 |
| 2006/0086078 | A1 | * | 4/2006 | Paul .............................. 60/226.1 |
| 2007/0044451 | A1 | * | 3/2007 | Jones ............................ 60/226.1 |
| 2010/0320316 | A1 | * | 12/2010 | Vauchel et al. ................. 244/1 N |

FOREIGN PATENT DOCUMENTS

GB 2389174 A * 12/2003

* cited by examiner

*Primary Examiner* — William H Rodriguez
(74) *Attorney, Agent, or Firm* — Jeffrey S. Melcher; Manelli Denison & Selter PLLC

(57) ABSTRACT

Cavities 4 are defined within an engine nacelle 1 with an inner surface 2 and an outer surface 3. Within these cavities 4, an evaporatable liquid 5 is arranged such that a proportion of the liquid 5 is in a gaseous phase in order to facilitate heat transfer between the inner surface 2 or the outer surface 3 and a hot surface. The liquid condenses upon the inner surface 2 or the outer surface 3 and collects into a pool for subsequent further evaporation by the hot surface of an insulated gate bi-polar transistor or convertor/generator components in order to facilitate further cooling of electric components housed or arranged in the nacelle 1 or nearby.

22 Claims, 3 Drawing Sheets

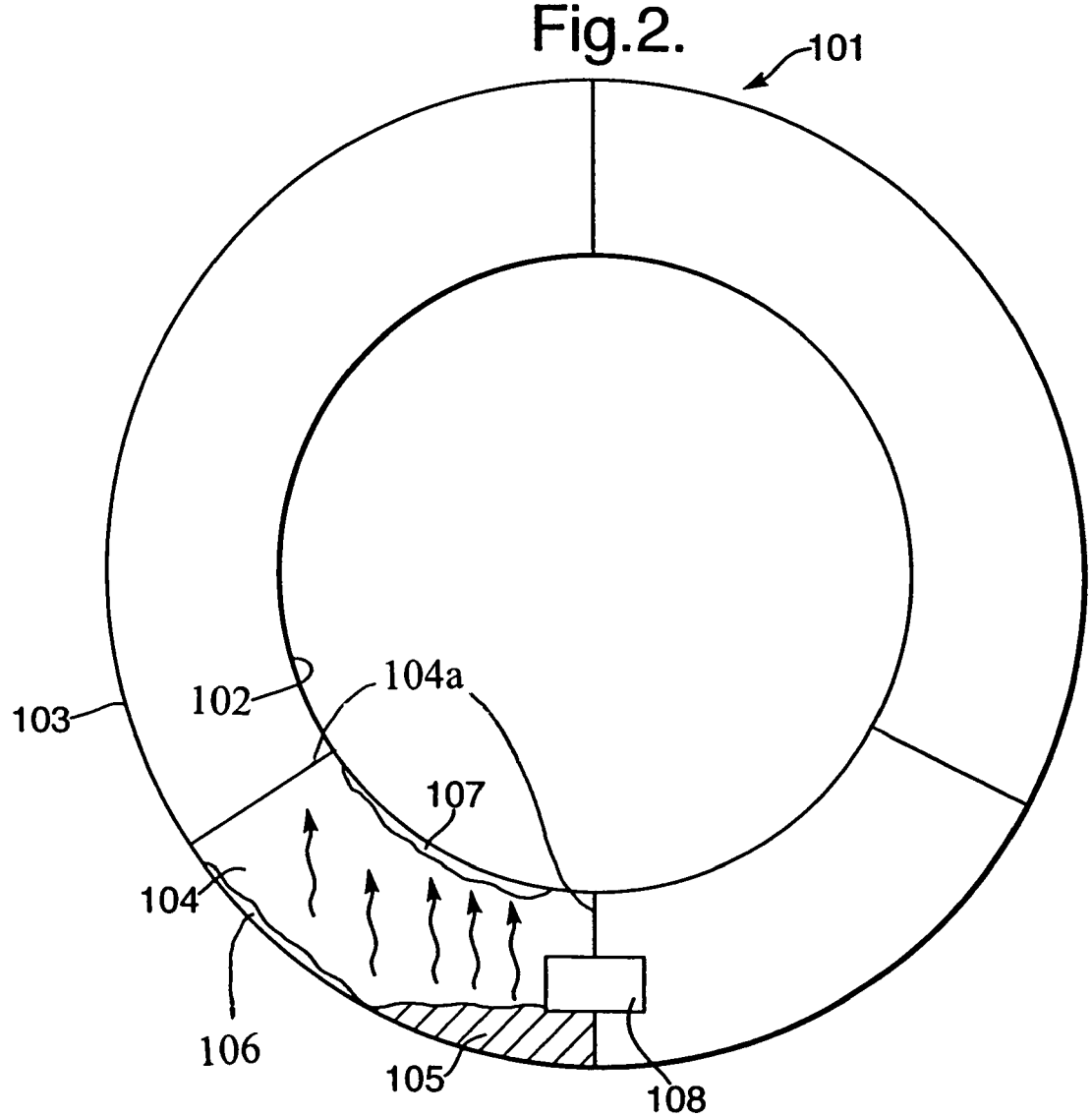

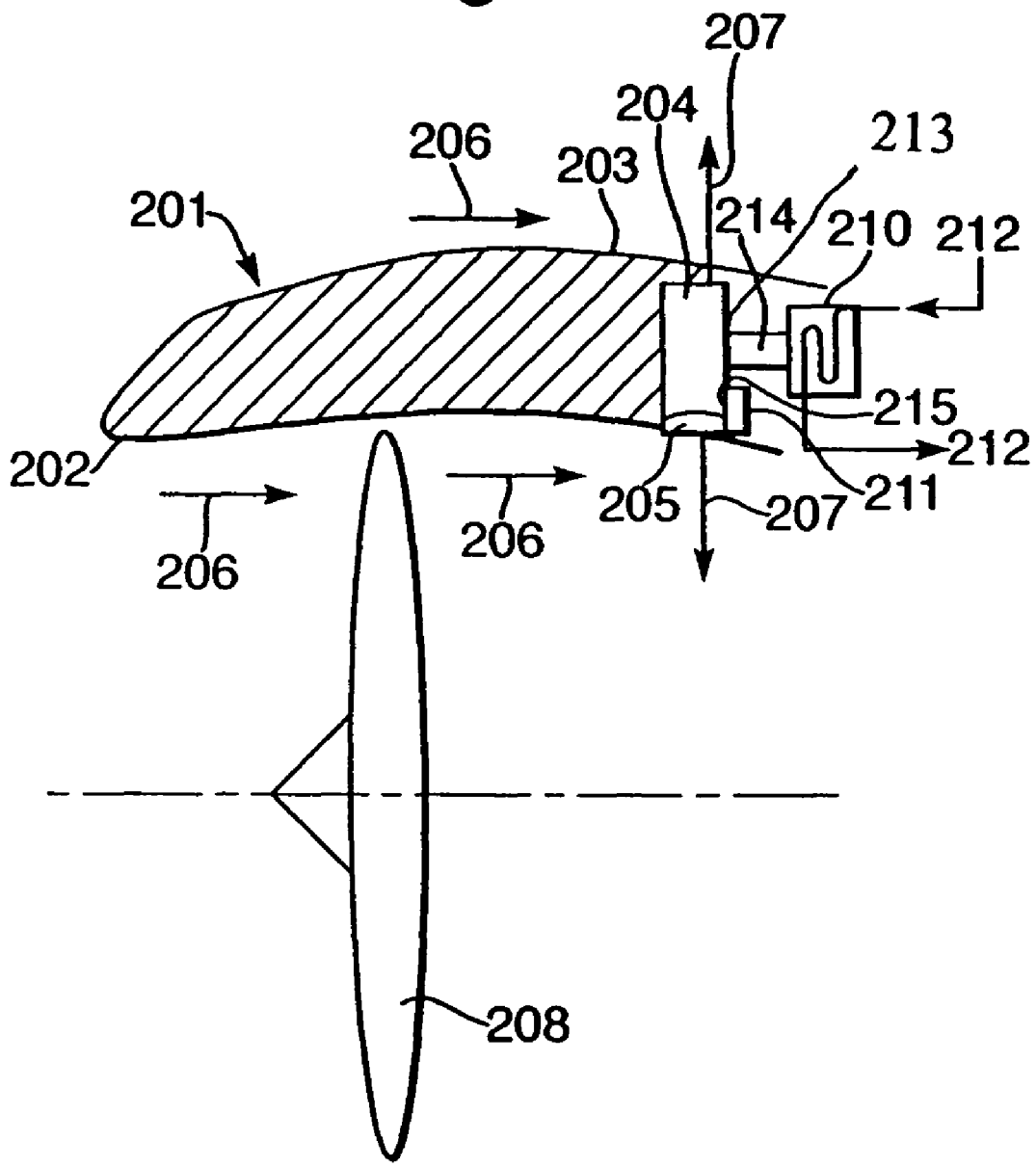

ENGINE COOLING

CROSS-REFERENCE TO RELATED APPLICATIONS

This application is a Continuation-In-Part of U.S. application Ser. No. 10/962,449 filed 13 Oct. 2004, which claims foreign priority under 35 U.S.C. 119 and 365 to United Kingdom Patent Application No. 0323993.6 filed 14 Oct. 2003.

FIELD OF THE INVENTION

The present invention relates to engine cooling and more particularly to engine component cooling in aircraft during idle modes prior to takeoff.

BACKGROUND OF THE INVENTION

It will be appreciated that engines, and in particular, aircraft engine components, such as electrical or electronic devices and/or static structural parts, must be cooled in order to remain within acceptable operational temperature ranges etc. Cooling with regard to aircraft engines can be achieved through utilisation of ambient airflow bypass through the engine utilising a heat exchanger and the differential between the cooler bypass side and the hot engine side of the exchanger. Bypass ambient air cooling is conventionally used for cooling an engine when the temperature differential and available heat exchanger area are adequate. It will be understood with regard to aircraft in particular, there are limitations upon the available heat exchanger area due to weight and volume accommodation problems.

Additionally with regard to aircraft engines, there are two differing cooling scenarios. Firstly, when the aircraft engine is operating at altitude and in a cruise state, it will be understood that the ambient air temperature, that is to say outside of the engine will be relatively cool creating a significant temperature differential and similarly, the bypass airflow rate will be at a reasonably high speed for cooling purposes. However, in a second cooling scenario when the engine is idling prior to take off, that is to say on the ground, there will be a relatively high ambient temperature and limited airflow for cooling. In such circumstances, in order to accommodate for this second scenario, it is necessary to provide significantly greater cooling capacity than strictly necessary for normal operation of the aircraft and engine at altitude. This additional cooling capacity adds to engine weight and operational complexities.

SUMMARY OF THE INVENTION

Accordingly the present invention provides an engine for an aircraft, the engine comprising an engine nacelle including an inner surface and an outer surface, at least one cavity defined between the inner surface and the outer surface, the nacelle including heat transfer means comprising an evaporatable liquid within the at least one cavity, a component or part is arranged in the cavity to transfer heat to the liquid or a component or part is arranged to transfer heat through a third surface to the liquid, the third surface partially defining the at least one cavity whereby the evaporatable liquid condenses upon the cooler of either one of the inner surface or the outer surface to facilitate cooling of the component or part.

Typically, each component or part is one or more electronic/electrical components or hot static engine parts.

Typically, the inner surface is part of a bypass duct for the engine. Normally, the outer surface will be part of the nacelle external surface.

Preferably, the nacelle surface will be reflective in order to minimise external heat gain.

Generally, the evaporatable liquid will be methanol or a similar substance with phase changes to allow heat transfer for cooling.

Normally, the cavity is shaped in order to facilitate liquid collection by gravity or capillary action.

Possibly, a third surface is provided in order to facilitate evaporation. Advantageously, the component or part is provided by an insulated gate bipolar transistor, a converter, a capacitor and/or an electrical generator.

BRIEF DESCRIPTION OF THE DRAWINGS

An embodiment of the present invention will now be described by way of example and with reference to the accompanying drawings in which:

FIG. 2 is a schematic front cross-section of a nacelle in accordance with a second aspect of the present invention;

DETAILED DESCRIPTION OF THE INVENTION

As indicated above, whilst an engine is idling prior to takeoff, there is generally limited cooling airflow and a generally higher ambient ground temperature than at altitude. Nevertheless, there still remains some airflow through a bypass duct generated by the fan of the engine. This airflow is at ground ambient temperature. The present invention utilises a heat transfer process by which an evaporatable liquid is utilised to transfer heat losses from electronic or other devices to a colder surface. A colder surface in this case is either the bypass duct interface or the outer nacelle surface. The gas will condense on the colder surface available (thereby passively switching between available surfaces) and the newly formed liquid will be available for further heat pick up from the heat source, component or part. Additionally, it will be appreciated that an intermediate fuel or other heat exchanger could be used in order to further condense the evaporatable liquid. During flying conditions, the evaporating liquid acts as a heat transport medium using cold bypass air and cold nacelle surfaces as condensing surfaces.

Figure 1:
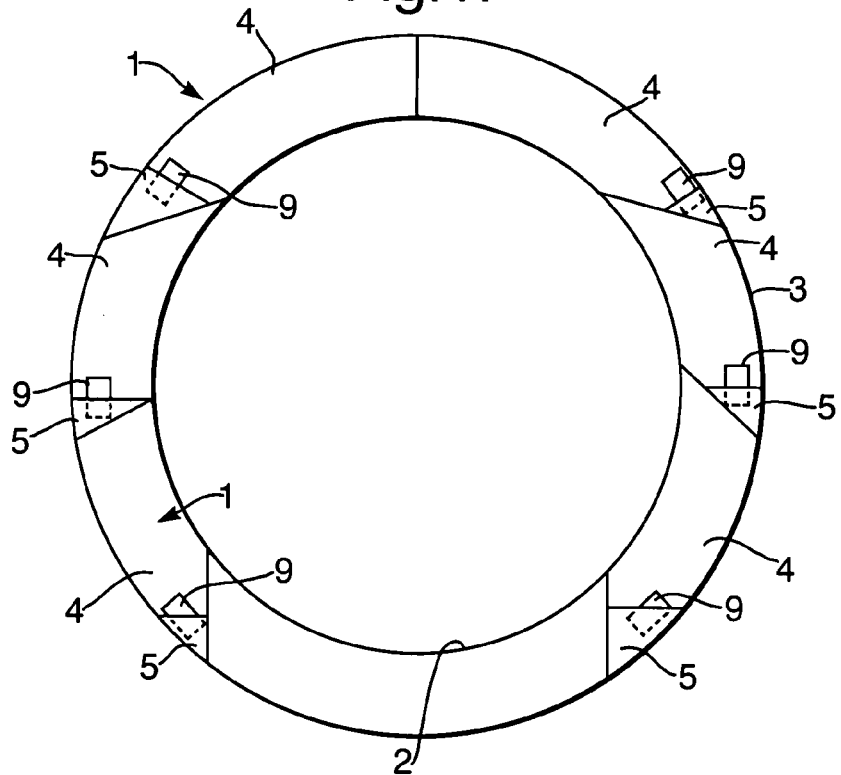
FIG. 1 is a schematic front cross-section of a nacelle in accordance with a first aspect of the present invention.
Figure 3:
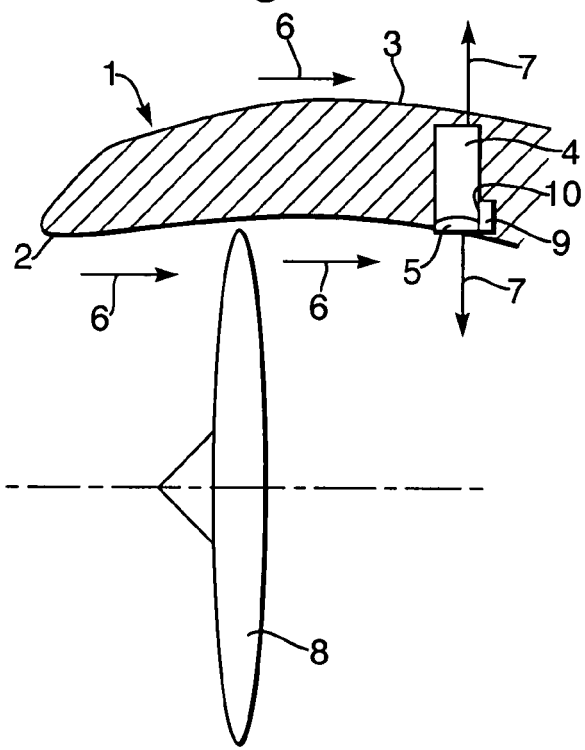
FIG. 3 is a part side cross-section of an engine nacelle inlet in accordance with a further aspect of the present invention; and, FIG. 4 is a part side cross-section of an engine nacelle inlet in accordance with an additional aspect of the present invention.

During hot ground/idling conditions and maximum take-off (MTO) conditions the device needs to be protected from any heat input on surface 2. This heat would be detrimental to the cooling mechanism, as the surface 2 is then acting as condenser surface and not as evaporator surface as would be the case at MTO conditions. A mechanical or smart material solution is required on surface 2 to protect its function during MTO conditions and hot ground starting condition. Referring to the FIGS. 1 and 3 illustrating front schematic cross-sections of an engine nacelle and part side cross-sections of an engine nacelle inlet in accordance with the present invention. Thus, the nacelle 1 comprises an inner surface 2 and an outer surface 3 between which cavities 4 are defined within which an evaporatable liquid 5 is collected in its condensed phase into a pool and contained in its gaseous phase within the cavity 4. In such circumstances, in use, the inner surface 2 is subject to airflow as a result of low pressure fan operation in the direction of arrowheads 6 whilst the evaporation and condensation of the evaporatable liquid 5 releases heat energy in the direction of arrowheads 7 and optional additional heatsinks as described in FIG. 3.

In operation, the inner surface 2 is part of the internal surface of a bypass duct for the engine and so airflow in the direction of arrowheads 6 is propelled by a low pressure fan 8 along that surface 2. Due to environmental conditions, the cavities 4 include a volume of evaporating liquid in a gaseous phase. Thus, this evaporating liquid condenses upon the surface 2 or 3 depending on which is colder. This condensation is precipitated by the external environmental temperature about the nacelle 1. However, in accordance with the present invention, condensation of the evaporatable liquid upon the surface 3 results in collection of that evaporating liquid in a liquid pool and this liquid is then evaporated due to the heat of an adjacent hot electrical module or other component or part 9. The electrical module is cooled on the hot surface where evaporation takes place. Normally, the cavities 4 are pressurized to form an appropriate temperature/pressure cooling regime between evaporation and condensation for within the engine. The cavities 4 are sealed units charged with an appropriate evaporating liquid pressure for the expected operating range for the arrangement.

In short, the present invention provides a thermo-siphon which acts as a heat switch between the outer surface 3 and the inner surface 2 of the nacelle 1. The present invention uses the respective outer and inner cooling airflows (arrowheads 6). This is achieved through utilising an evaporating liquid. The evaporating liquid operates between ambient temperatures, condensing temperatures at the outer surface 3 and hot surface evaporating temperatures presented at the inner surface 2 or through a specific hot surface generating device such as an insulated gate bi-polar transistor 9. There is autonomy in heat transfer between the outer surface 3 and the inner surface 2 due to the inherent nature of the evaporating liquid and with preferential condensing on the coldest available surface.

Normally, the evaporating or evaporatable liquid will be Methanol. In such circumstances, if each cavity incorporates 2 kg of Methanol, the phase changes between condensed and evaporated states will achieve a thermo-siphon effect or transfer whereby there is a cooling rate of 20 Kw or more. Thus, across a surface of 1.8 msq and assuming that a heat transfer rate on the outer surface 3 (air) side in the order of 12 Kw per $m^2$. It will be understood that the thermo-siphon effect is well within the capacity of the arrangement. Furthermore, other substances with an appropriate phase change regime may be used.

Clearly, it is important that the outer surface 3 achieves best performance in terms of condensation of the evaporated liquid. Thus, in order to prevent unnecessary heat gain from ambient external air and solar exposure, it is preferable that this outer surface is rendered fully reflective on its exposed side. In order to achieve best performance, the cavity side of the inner surface 2 towards the cavity 4 acts as a condensation surface as well as the cavity side of the outer surface 3 towards the cavity 4 acts as a condensation surface. In order to achieve best performance, these surfaces should be highly thermally conductive for effective phase change whilst there is good thermal isolation between the surfaces 2, 3. Thus, as can be seen in FIG. 1, each cavity 4 is designed to have two exposed surfaces in contact with ambient airflow and bypass airflow (arrowheads 6) with a shape to promote collection of condensed evaporating liquid 5 through gravity or capillary action along the inner cavity surface side towards the cavity 4.

As indicated above, in order to generate evaporation, it is desirable to mount a heating device in association with the pool of evaporatable liquid 5 in order to generate heat transfer or thermal siphoning between surface 10 and the inner surface 2 or the outer surface 3. Typically, this heating device will be an insulated gate bi-polar transistor (IGBT). This heating device will, as indicated, generate a vapour stage or gaseous phase for the evaporating liquid further heating through transfer across surface 10 will then occur such that heat is transferred from that surface 10 through the gaseous phase liquid for condensation on the inner cavity side of the outer surface 2 or 3. In such circumstances, there is an auto temperature correction between the surface 2 and surface 3 utilised by the present invention for temperature control.

The present invention can be incorporated within an engine nacelle provided there is maximum air contact for thermal siphoning. It will be understood that the present invention requires limited space within the nacelle and therefore is conveniently accommodated within such a nacelle.

The present invention achieves cooling without significantly adding to weight or to cost. As indicated above, limited space is required to provide significantly greater cooling within the engine at idling conditions. The invention is passive and does not require any external control mechanism except from installation of a thermal protection mechanism upon surface 2 during hot bypass air (725° C.). In accordance with the present invention, cooling is achieved by utilising airflow (ambient outside the engine and adjacent to the outer surface 3 and bypass inside the bypass duct of the engine and adjacent inner surface 2). Such airflows are provided by current engine operation.

FIG. 2 shows a second aspect of the present invention through an exemplary cavity 104 that which still operates generally in accordance with the principles outlined above. Other cavities will operate in a similar fashion. The cavity 104 is integrally formed within the nacelle and includes the inner surface 102 and the outer surface 103 wherein the cavity 104 includes side walls 104a that extend between said inner and outer surfaces 102, 103 and contacts and is secured as by welding to said inner and outer surfaces 102, 103 at each end of the side walls wherein a volume of evaporatable liquid 105 is held in the cavity 104. This liquid 105 evaporates and condenses as condensate films 106, 107 on the surfaces 102, 103. This closed cycle of evaporation and condensation acts to transfer heat energy and so cools a component such as a transistor 108 which dips into the pool of liquid 105. As indicated one or both of the surfaces 102, 103 may be associated with an air flow or draught to further disperse heat energy to that air flow for overall cooling effects. Furthermore, specific heat sinks may be provided. In any event, it will be understood that the liquid 105 will continue to evaporate until the saturation temperature for the liquid 105 in vapour form within the closed cavity 104.

FIG. 4 is a schematic part cross-section of an engine nacelle 201 operating in a similar fashion to that depicted in FIG. 3 but with a fuel cooled heat exchanger 210. Thus, as previously a fan 208 drives an air flow 206 and a pool of liquid 205 alternately evaporates and condenses to transfer heat energy in the directions of arrowheads 207 between an inner surface 202 and an outer surface 203. Typically, a component or part 211, such as an electronic/electrical device or static engine structure, is cooled by the evaporation of the liquid 205.

In accordance with the additional aspect of the present invention depicted in FIG. 4, a cavity 204 is connected to a heat exchanger 210 by a passage 214. Essentially, the heat exchanger 210 includes a block with a labyrinth passage through which a flow of fuel in the direction of arrowheads 212 passes to cool that block. A surface 213 of the block is cooled by the fuel and evaporated liquid in the passage 214 condenses on the surface 213 of the block and returns through the passage 214 to the pool of liquid 205. The heat exchanger 210 cools the component, or part 211 for hot ground conditions.

In accordance with the present invention a hot surface of a component or part is generally in contact with an evaporatable liquid to cool that part. This evaporatable liquid then condenses upon a cooler surface which may be passively cooled (ambient stagnant air) or actively cooled through air flows or dissipation through a heat exchanger or heat sink. In such circumstances, the arrangement maintains a cooling capacity at times of low air flow cooling such as prior to take-off. The invention acts as a "heat pipe" along with heat energy is transferred for cooling by the evaporation/condensation cycle.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An engine for an aircraft, the engine comprising an engine nacelle including an inner surface and an outer surface wherein said inner surface and said outer surface are highly thermally conductive surfaces, at least one cavity defined by the inner surface and the outer surface and side walls between said inner and outer surfaces wherein said cavity is integrally formed within said nacelle, the nacelle including heat transfer means comprising an evaporatable liquid within the at least one cavity, a component is arranged in the cavity to transfer heat to the liquid whereby the evaporatable liquid condenses upon the cooler of either one of the inner surface or the outer surface to facilitate cooling of the component.

2. An engine as claimed in claim 1 wherein the inner surface is part of a bypass duct for the engine.

3. An engine as claimed in claim 1 wherein the outer surface is a nacelle external surface.

4. An engine as claimed in claim 3 wherein the external nacelle surface is reflective in order to minimize external heat gain.

5. An engine as claimed in claim 1 wherein the evaporatable liquid is methanol or similar phase change substance.

6. An engine as claimed in claim 1 wherein the cavity is shaped in order to facilitate liquid collection by gravity or capillary action.

7. An engine as claimed in claim 1 wherein a third surface is provided in order to facilitate evaporative cooling.

8. An engine as claimed in claim 7 wherein the component is selected from the group comprising an insulated gate bipolar transistor, a converter, a capacitor, a transistor and an electrical generator.

9. An engine as claimed in claim 1 wherein the component is selected from the group comprising an electrical component, an electronic component and a static engine structure.

10. An engine as claimed in claim 1 wherein there are a plurality of cavities, each cavity is defined between the inner surface and the outer surface, the cavities are arranged circumferentially around the engine nacelle.

11. An engine as claimed in claim 2 wherein a fan is arranged in the bypass duct and the fan is arranged to propel an air flow along the inner surface.

12. An engine for an aircraft, the engine comprising an engine nacelle including an inner surface and an outer surface wherein said inner surface and said outer surface are highly thermally conductive surfaces, at least one cavity defined by the inner surface and the outer surface wherein said cavity is integrally formed within said nacelle, the nacelle including heat transfer means comprising an evaporatable liquid within the at least one cavity, a component is arranged to transfer heat through a third surface to the liquid, the third surface partially defining the at least one cavity whereby the evaporatable liquid condenses upon the cooler of either one of the inner surface or the outer surface to facilitate cooling of the component.

13. An engine as claimed in claim 12 wherein the inner surface is part of a bypass duct for the engine.

14. An engine as claimed in claim 12 wherein the outer surface is a nacelle external surface.

15. An engine as claimed in claim 14 wherein the external nacelle surface is reflective in order to minimize external heat gain.

16. An engine as claimed in claim 12 wherein the evaporatable liquid is methanol or similar phase change substance.

17. An engine as claimed in claim 12 wherein the cavity is shaped in order to facilitate liquid collection by gravity or capillary action.

18. An engine as claimed in claim 12 wherein a third surface is provided in order to facilitate evaporative cooling.

19. An engine as claimed in claim 18 wherein the component is selected from the group comprising an insulated gate bipolar transistor, a converter, a capacitor, a transistor and an electrical generator.

20. An engine as claimed in claim 12 wherein the component is selected from the group comprising an electrical component, an electronic component and a static engine structure.

21. An engine as claimed in claim 12 wherein there are a plurality of cavities, each cavity is defined between the inner surface and the outer surface, the cavities are arranged circumferentially around the engine nacelle.

22. An engine as claimed in claim 13 wherein a fan is arranged in the bypass duct and the fan is arranged to propel an air flow along the inner surface.

* * * * *